US008990377B2

(12) United States Patent
Lake et al.

(10) Patent No.: US 8,990,377 B2
(45) Date of Patent: Mar. 24, 2015

(54) METHOD TO EFFECTIVELY COLLECT DATA FROM SYSTEMS THAT CONSISTS OF DYNAMIC SUB-SYSTEMS

(75) Inventors: John Michael Lake, Cary, NC (US); Wenjian Qiao, Cary, NC (US); Srinivasan K. Rangaswamy, Morrisville, NC (US); Christopher Paul Vignola, Port Jervis, NY (US)

(73) Assignee: International Business Machines Corporation, Armonk, NY (US)

( * ) Notice: Subject to any disclaimer, the term of this patent is extended or adjusted under 35 U.S.C. 154(b) by 2192 days.

(21) Appl. No.: 11/005,529

(22) Filed: Dec. 6, 2004

(65) Prior Publication Data

US 2006/0168194 A1    Jul. 27, 2006

(51) Int. Cl.
*G06F 15/173* (2006.01)
*G06F 9/46* (2006.01)
*H04L 29/08* (2006.01)
*G06F 9/50* (2006.01)
*G06F 11/34* (2006.01)

(52) U.S. Cl.
CPC .............. *H04L 67/26* (2013.01); *G06F 9/505* (2013.01); *H04L 67/325* (2013.01); *G06F 11/3495* (2013.01); *G06F 11/3433* (2013.01)
USPC ........... 709/224; 709/223; 709/225; 709/226; 718/105

(58) Field of Classification Search
USPC .................... 709/223, 224, 225, 226; 718/105
See application file for complete search history.

(56) References Cited

U.S. PATENT DOCUMENTS

| | | | |
|---|---|---|---|
| 6,119,167 A | 9/2000 | Boyle et al. | 709/234 |
| 6,374,367 B1* | 4/2002 | Dean et al. | 714/37 |
| 6,707,903 B2 | 3/2004 | Burok et al. | 379/265.02 |
| 2002/0049841 A1* | 4/2002 | Johnson et al. | 709/225 |
| 2002/0152305 A1* | 10/2002 | Jackson et al. | 709/224 |
| 2003/0084108 A1 | 5/2003 | Syed | 709/206 |
| 2003/0188222 A1* | 10/2003 | Abbondanzio et al. | 714/12 |
| 2004/0037319 A1* | 2/2004 | Pandya | 370/469 |
| 2004/0186379 A1* | 9/2004 | Landry et al. | 600/437 |
| 2004/0243771 A1* | 12/2004 | Oldfield et al. | 711/151 |
| 2005/0038833 A1* | 2/2005 | Colrain et al. | 707/203 |
| 2006/0020842 A1* | 1/2006 | Olsen et al. | 713/502 |
| 2008/0316013 A1* | 12/2008 | Soderkvist et al. | 340/501 |

* cited by examiner

*Primary Examiner* — Ninos Donabed
*Assistant Examiner* — Farrukh Hussain
(74) *Attorney, Agent, or Firm* — Steven M. Greenberg, Esq.; CRGO Law (57) ABSTRACT

A method, apparatus and computer instructions are provided to improve the push/pull workload management model with intelligent routing to effectively collect data from systems that consist of dynamic sub-systems. The invention improves the push/pull model of the referenced invention with intelligent request routing to solve the above problem. An API is exposed in the workload manager enabling its request router to decline requests to route to idle sub-systems. This allows the monitoring agent to avoid sending a pull request to an idle sub-system. Each sub-system will push the data to the agent as it enters the idle state. The agent caches the data it receives from idle sub-systems and combines it with data it pulls from active and stopped sub-systems.

21 Claims, 4 Drawing Sheets

| Time Series 402 | Sub-system 404 | Sub-system 406 | Sub-system 408 | Sum of running sub-systems 410 | Overall state of the system 412 |
|---|---|---|---|---|---|
| T0 | 0 | 0 | 0 | 0 | 0 |
| T1 | 100 | 50 | 70 | 220 | 220 |
| T2 | 120 | 100 | 150 | 370 | 370 |
| T3 | 150 | 120 | - | 270(wrong) | 420(correct) |

METHOD TO EFFECTIVELY COLLECT DATA FROM SYSTEMS THAT CONSISTS OF DYNAMIC SUB-SYSTEMS

BACKGROUND OF THE INVENTION

1. Technical Field

The present invention relates to workload management. More particularly, the present invention relates to an improvement of a push/pull workload management model with intelligent routing to effectively collect data from systems that consist of dynamic sub-systems.

2. Description of Related Art

Widely distributed, "open" network computer resources are the norm in today's network environment. These resources make up a complex grouping of applications, desktops, networks and servers, each with specific requirements and functions.

In both distributed and IBM® z/OS™ environments, workload scheduling, the orderly sequencing of batch program execution should be flexible to accommodate varying resources and levels of demands securely and automatically. If timely scheduling is desired to help meet service-level agreements, any information technology (IT) department should be able to set policies that govern batch activity.

Systems administrators are in a unique position in that they are expected to understand the extraordinary batch workload demands created when key business processes are automated. With the addition of each new application, whether for enterprise resource planning, customer relationship management, financial reporting or another vital business activity, the batch workload may grow at an incredible rate. At many companies there is a potential for daily batch processing workloads to triple or even quadruple in several years. At the same time, the window for processing jobs is shrinking, with many critical jobs needing to be completed before each day's regular online work begins.

The workload management challenge may be further complicated by interdependencies between jobs and the availability of personnel who understand how to manage batch jobs in the context of important business priorities. Consider, for example, the requirements that may be triggered when a customer places an order over the Internet. Depending on the environment, the customer's request could initiate a UNIX® job to acknowledge the order, an IBM AS/400® and iSeries™ job to order parts, an OS/390® and zSeries™ job to debit the customer's bank account or payment system and a Microsoft® Windows NT® job to print a docket and address labels. If any job fails, the company's revenues and customer satisfaction might be at risk.

Because batch workloads provide the raw material for many of today's automated business processes, it is more important than ever for systems administrators to have an efficient, reliable and scalable way to manage their batch workloads seamlessly in a distributed environment. When evaluating management software options to help you plan, organize and execute workload production in your environment, you should consider several key criteria, such as the ability to:

Integrate workloads from multiple applications, across multiple platforms and operating systems;

Handle rapidly increasing batch workload demands;

Automate tasks to enhance productivity of resources and personnel; and

Drive business value by integrating with other system management solutions.

In a system that consists of a number of sub-systems, there is usually an intelligent agent monitoring the performance and managing the resources. Depending on the workload and demand, the intelligent agent may dynamically expand and shrink the system, i.e., start and stop sub-systems. For example, in an on-demand system, servers may be dynamically started and stopped based on the MAPE (monitoring, analysis, plan, and execution) loop calculation to meet the service requirements. As another example, in a cluster, the workload manager may dynamically start and stop cluster members based on the performance analysis and workload distribution. As an additional example, in a IBM® z/OS™ application server usually has one of multiple servant processes and these servant processes may come and go depending on the workload.

Performance monitoring is very important in order to meet the service requirements in such a dynamic system. The performance data are tracked in individual sub-systems. The data from all the sub-systems will be summed up to calculate the overall performance of the system. Many summed up performance data represent the overall status of the system including both the sub-systems that are running and the sub-systems that have once started but now stopped. These data are monotonically increasing by nature. For example, the total number of requests should include all the requests processed by the system.

The existing monitoring tools usually call application program interfaces (APIs) to collect the performance data from the running sub-systems and then calculate the overall status by adding them up. However, this calculation may not get the real overall status of the system since the performance data are tracked by individual sub-systems, the data in a sub-system will be gone when the sub-system is stopped. Simply adding performance data over the running sub-systems will lose the data from the stopped sub-systems.

BRIEF SUMMARY OF THE INVENTION

The present invention provides a method, apparatus and computer instructions to improve the push/pull workload management model with intelligent routing to effectively collect data from systems that consist of dynamic sub-systems. The exemplary aspects of the present invention facilitate an Application Program Interface (API) that is exposed in the Workload Manager enabling its request router to decline requests to route to idle sub-systems. This allows a monitoring agent to avoid sending a pull request to an idle sub-system. Each sub-system will push the data to the agent as it enters the idle state. The agent caches the data it receives from idle sub-systems and combines it with data it pulls from active and stopped sub-systems.

Additionally, the exemplary aspects of the present invention provide for extra efficiency for the push aspect of the model by employing delay and comparison techniques to minimize the frequency and volume of data pushed to the agent. The delay technique waits for a specified interval before pushing data to the agent. This is done to avoid excessive and unnecessary data pushes in a low transaction rate environment, where the sub system experiences frequent, but momentary idle periods. The comparison technique is used by the sub system to only send data that has actually changed since the last push (or pull). If the data has not changed, there is no reason to send it to the agent.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
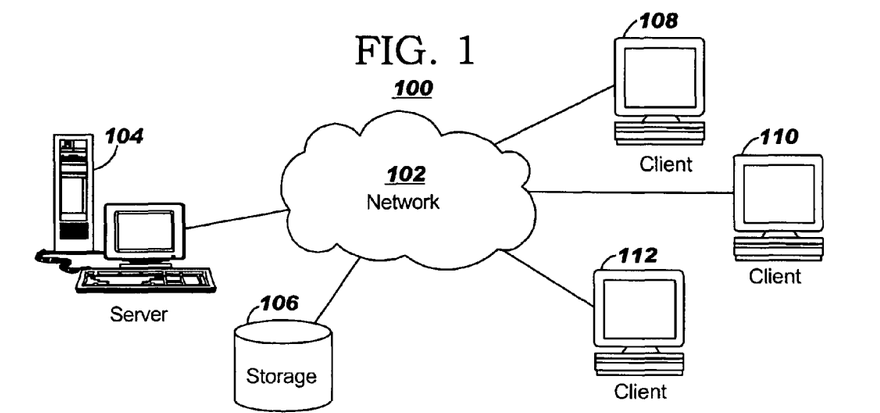
FIG. 1 is a pictorial representation of a network of data processing systems in which the present invention may be implemented.
Figure 2:
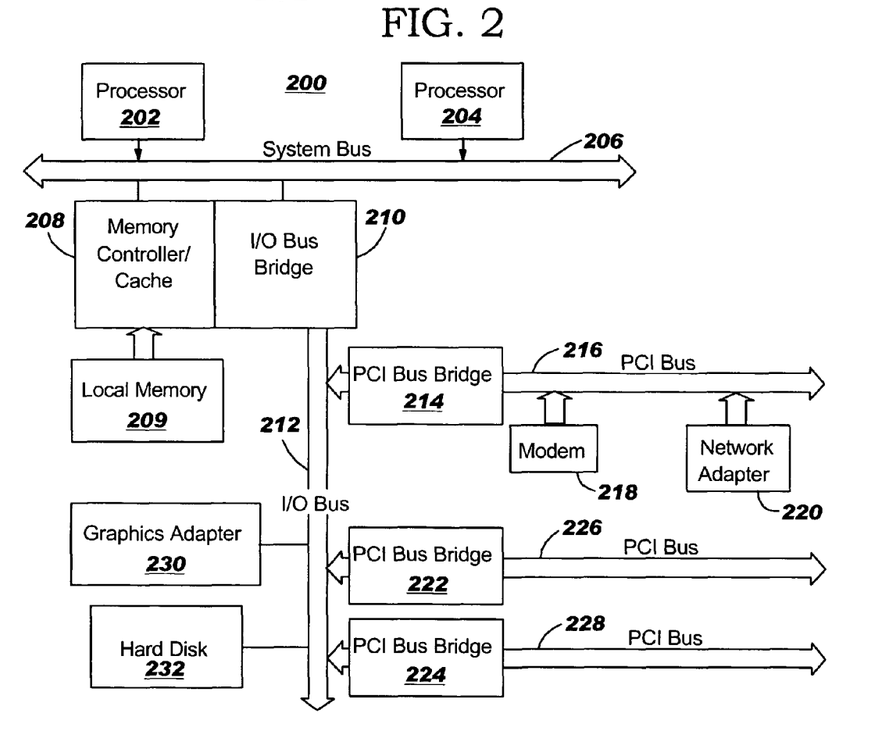
FIG. 2 is a block diagram of a data processing system that may be implemented as a server in accordance with a preferred embodiment of the present invention.
Figure 3:
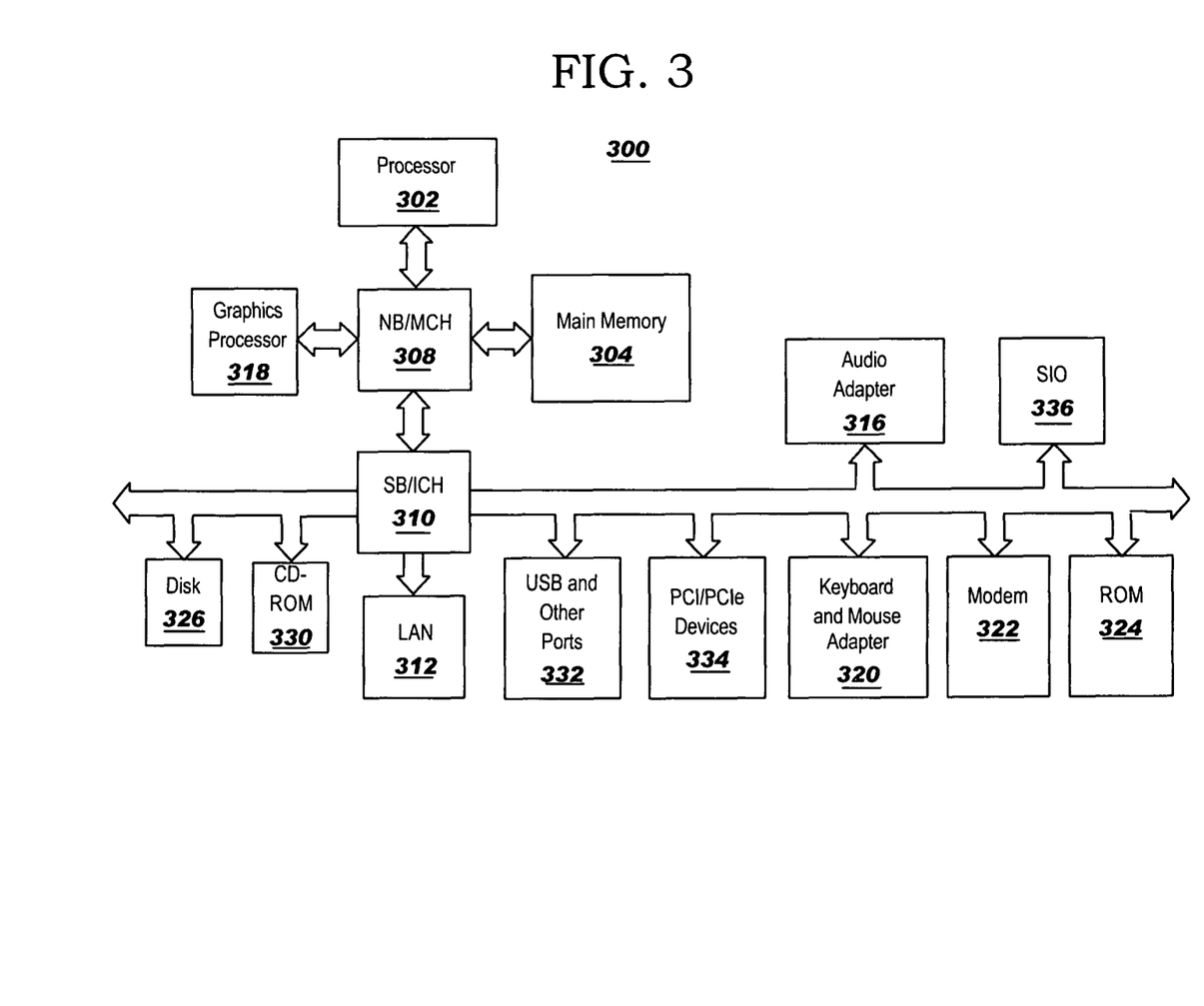
FIG. 3 is a block diagram of a data processing system in which the present invention may be implemented.

The present invention provides a method, apparatus and computer instructions to improve the push/pull workload management model with intelligent routing to effectively collect data from systems that consist of dynamic sub-systems. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Figure 4:
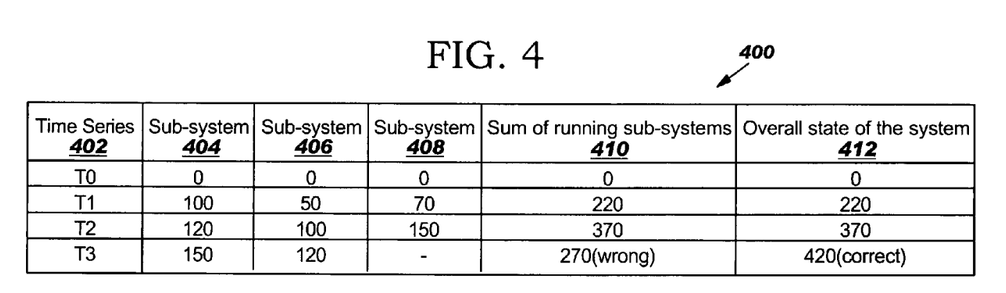
FIG. 4 is a table illustrating the problem and impact of simply adding performance data of all running sub-systems without considering stopped sub-systems.

Turning now to FIG. 4, a table 400 illustrating the problem and impact of simply adding performance data of all running sub-systems without considering stopped sub-systems is depicted. Table 400 lists the value of a counter which tracks the number of servlet requests in each sub-system 404, 406 and 408. At T0, no sub-systems are running. The counter is requested over a predetermined time series 402 consisting of T0, T1, T2 and T3. At T1 and T2, both the sum of the running sub-systems 410 and the overall state of the system 412 provide an accurate count of the total servlet requests of the monitored sub-systems. Assuming that sub-system 408 stops after T2, then as shown in the table, the sum of the running sub-systems 410 at T3 would provide an incorrect state of the overall system. The most accurate state of the overall system would be the sum of sub-systems 404 and 406 at T3 and the last report from sub-system 408 at T2, which is shown in the overall state of the system 412 at T3.

The present invention uses a monitoring agent to make direct calls to each running sub-system to pull the current performance data. Additionally, each sub-system pushes its current performance data to the monitoring agent upon a normal stop of the sub-system. Upon request, the monitoring agent aggregates the performance data acquired through both push and pull. Furthermore, the cached data allows for data recovery in the event a sub-system terminates abnormally or is temporarily unavailable.

While this solution solves the problem of losing the data contribution of stopped, terminated, or temporarily unavailable sub-systems, the solutions pull behavior introduces a level of inefficiency into the overall system that makes inefficient use of compute resources by pulling data from sub-systems where nothing has changed since the last pull. This condition is common in an on-demand environment with dynamic sub-systems. Moreover, the pull invocation is itself a request to process a work in running sub-systems and may skew certain workload manager decisions by creating false demand.

Figure 5:
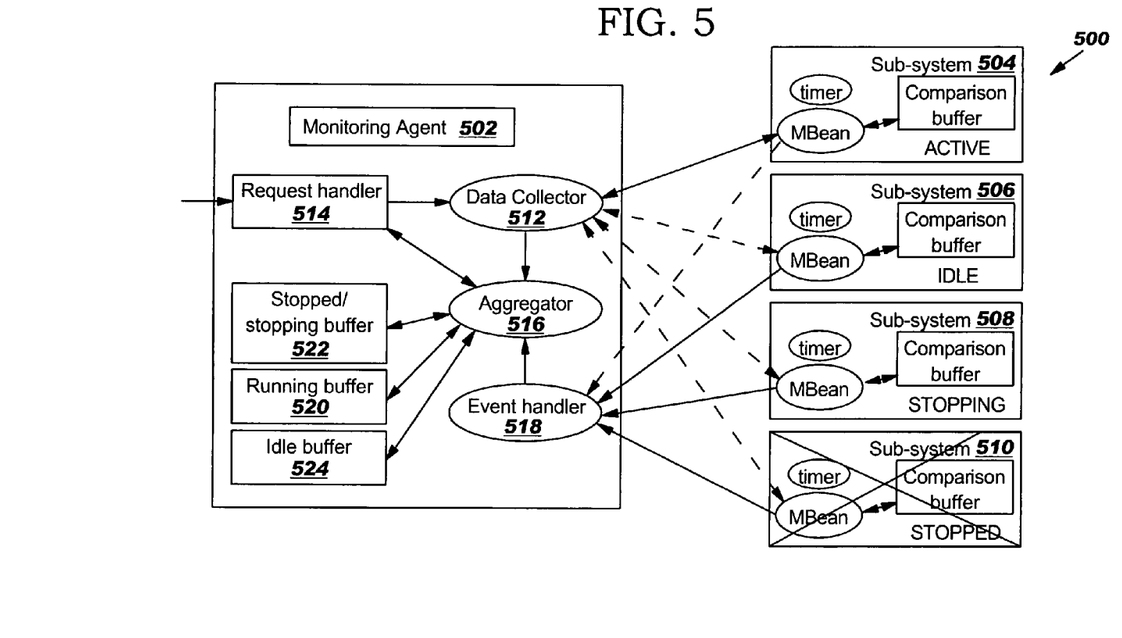
FIG. 5 is a workload manager diagram illustrating an exemplary operation of a monitoring agent in accordance with a preferred embodiment of the present invention.

Turning now to FIG. 5, a workload manager diagram 500 is depicted illustrating an exemplary operation of a monitoring agent 502 in accordance with a preferred embodiment of the present invention. Monitoring agent 502 receives a request from the workload manager through request handler 514. Request handler 514 sends the request through data collector 512 which initiates pull requests to each of sub-systems 504, 506, 508 and 510 that are active, in this example sub-system 504. Data collector 512 provides status to monitoring agent 502 of each idle sub-system, in this example sub-system 506, to which the request is not routed. Monitoring agent 502 is able to do this because by its very nature it is aware of which sub-systems 504, 506, 508 and 510 are processing requests and which are not. The MBean of sub-systems 504, 506, 508 and 510 must expose an API enabling the monitoring agent's 502 processing agent in each sub-system 504, 506, 508 and 510 to command the MBean to push its' data upon demand. The monitoring agent 502 handles this data no differently than data from a stopped sub-system, in this example sub-system 510. In response to the pull request sent by data collector 512, the data from active sub-system 504 is returned to data collector 512 and is then sent to aggregator 516. The data from the active sub-system 504 is then stored in the running sub-systems storage buffer 520.

Each pull operation issued by monitoring agent 502 is optimized to employ both a timer-delay and a comparison buffer. Once one of sub-systems 504, 506, 508 and 510 enters an idle state, it sets a timer. If a new workload manager request arrives while the timer is running, the timer is reinitialized. If the timer expires before a new workload manager request arrives, idle sub-system 506 will initiate a data push operation. The comparison buffer of idle sub-system 506 holds a copy of the data value that was provided during either the last push or last pull operation. Once a push operation is initiated, only data with values different from their counterparts in the comparison buffers of sub-system 506 is transmitted to event handler 518. The data from idle sub-system 506 is then sent through event handler 518 to aggregator 516 and stored in the idle sub-systems storage buffer 524. If no data values have changed since the last push or pull, the push operation is cancelled.

Additionally, if one of sub-system 504, 506, 508 and 510 is stopped due to declining demand while the timer is running, in this example sub-system 508, a data push operation is initiated. The comparison buffer of stopping sub-system 508 holds a copy of the data value that was provided during either the last push or last pull operation. Once a push operation is initiated, only data with values different from their counterparts in the comparison buffers of sub-system 508 is transmitted to event handler 518. The data from stopping sub-system 508 is then sent through event handler 518 to aggregator 516 and stored in the stopped or stopping sub-systems storage buffer 522. If no data values have changed since the last push or pull, the push operation is cancelled.

Additional workload manager requests that issue a pull operation may also be optimized through use of the sub-systems 504, 506, 508 and 510 comparison buffers. When a pull operation arrives in sub-systems 504, 506, 508 and 510, the pull request may use the values in the comparison buffer to determine what data has changed and return only the changed data.

Aggregator 516 then compiles the values of all known sub-systems, based on the known status from monitoring agent 502. Aggregator 516 pulls data for sub-system 504 from running sub-system buffer 520, data for sub-system 506 from idle sub-system buffer 524 and data for sub-systems 508 and 510 from stopping or stopped sub-system buffer 522. It is noted that data from sub-system 510 was stored in stopping or stopped sub-system buffer 522 at the time sub-system 520 was stopped due to declining demand. Then, aggregator 516 reports the overall state of the sub-system to workload manager 500.

Figure 6:
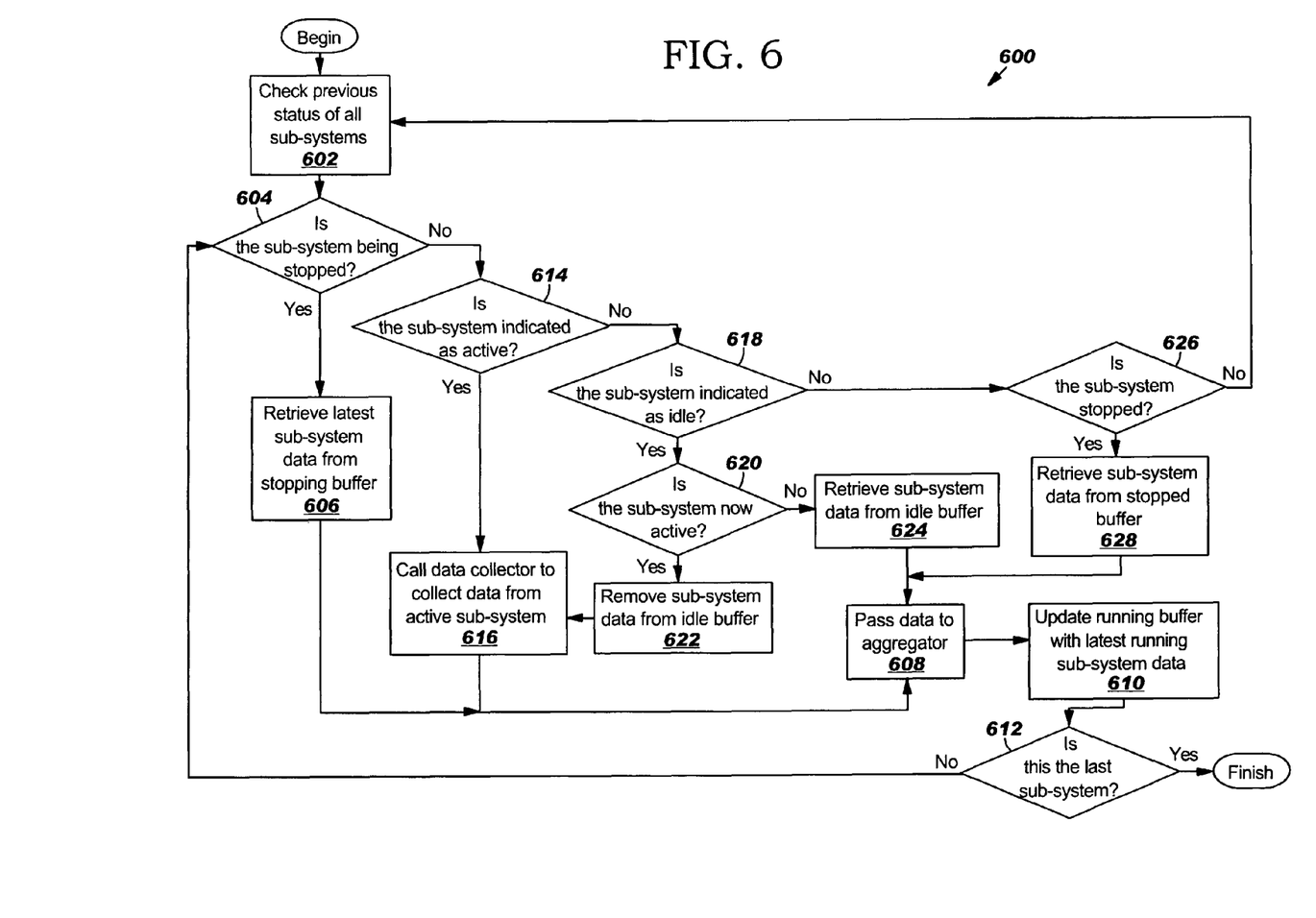
FIG. 6 is a flow diagram illustrating an exemplary operation of the data collection system in accordance with a preferred embodiment of the present invention.

In FIG. 6, a flow diagram 600 illustrating an exemplary operation of the data collection system is depicted in accordance with a preferred embodiment of the present invention. As the operation begins, a check is made as to the previous status of all the sub-systems (block 602).

At block 604, a determination is made as to whether the sub-system is in the process of stopping. If so, the operation retrieves the latest data that was pushed to the stopped or stopping sub-system buffer (block 606) and sends to the aggregator (block 608). Since the system is stopping, the aggregator ignores updating the running buffer performed at block 610. A decision is then made as to whether this is the last sub-system to be processed (block 612), if not the operation returns the block 604; if so, the operation ends.

Returning to block 604, if the system is not stopping, a determination is made as to whether the sub-system is indicated as active (block 614). If so, a pull request is sent from the data collector to the active sub-system (block 616). The sub-system responds and the data is passed to the aggregator (block 608). The aggregator then updates the running sub-system buffer with the latest running sub-system data (block 610). A decision is then made as to whether this is the last sub-system to be processed (block 612), if not the operation returns t0 block 604; if so, the operation ends.

Retuning to block 614, if the sub-system is not indicated as active, a determination is made to see if the sub-system is indicated as idle (block 618). If the system is indicated idle, a further determination is made to see if the system is now active (block 620). If so, the idle data stored in the idle buffer is removed (block 622) and a pull request is sent from the data collector to the now active sub-system (block 616). The sub-system responds and the data is passed to the aggregator (block 608). The aggregator then updates the running sub-system buffer with the latest running sub-system data (block 610). A decision is then made as to whether this is the last sub-system to be processed (block 612), if not the operation returns the block 604; if so, the operation ends.

Returning to block 618, if the sub-system is indicated idle and at block 620 the sub-system is not active, then the idle data for the sub-system is retrieved from the idle sub-system buffer (block 624) and sent to the aggregator (block 608). Since the system is idle, the aggregator ignores the update performed at block 610. A decision is then made as to whether this is the last sub-system to be processed (block 612), if not the operation returns the block 604; if so, the operation ends.

Returning to block 618, if the sub-system is not indicated as idle, a determination is made as to whether the sub-system is indicated as stopped (block 626). If so, the operation retrieves the latest data that was pushed to the stopped or stopping sub-system buffer (block 628) and sends to the aggregator (block 608). Since the system is stopped, the aggregator ignores the update performed at block 610. A decision is then made as to whether this is the last sub-system to be processed (block 612), if not the operation returns the block 604; if so, the operation ends. If the sub-system is not indicated as stopped at block 626, the operation returns to block 602 to again verify the status of the sub-system.

In summary, the present invention provides a method, apparatus and computer instructions to improve the push/pull workload management model with intelligent routing to effectively collect data from systems that consist of dynamic sub-systems. The exemplary aspects of the present invention facilitate a way to configure business systems management software to ensure that operators address the most severe problems that impact the business first. The exemplary aspects of the present invention interrogate an administrator for the business as to those systems, business services, resources and customers whom the business feels are most important to the business' bottom line. Through a rule-based set of GUI constructs, the administrator configures the software system to ensure the most severe problems are addressed first.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for improving workload management of a computer system comprising a plurality of sub-systems, the method comprising:
   receiving a status of at least one sub-system of the computer system, wherein the status of the at least one sub-system is one of active and inactive;
   receiving a request for an overall state of the computer system;
   responsive to the received request, retrieving latest performance data for one or more sub-systems having an active status and includes sending a pull request only to the one or more sub-systems having the active status; and determining the overall state of the computer system based upon the latest performance data for the one or more sub-systems having the active status and previously stored performance data for one or more sub-systems, of the computer system, with an inactive status.

2. The method of claim 1, wherein the inactive status of the at least one sub-system is one of idle, stopping or stopped.

3. The method of claim 2, wherein the retrieving the latest performance data for the one or more sub-system having the active status includes:
receiving the latest performance data from the one or more sub-systems having the active status; and
passing the latest performance data to an aggregator.

4. The method of claim 2, wherein the retrieving the latest performance data for an idle sub-system includes:
determining if the status of the idle sub-system has changed;
in response to no status change, retrieving the latest performance data for the idle sub-system from a buffer; and
passing the latest performance data to an aggregator.

5. The method of claim 4, in response to a status change, notifying a monitoring agent of the status change.

6. The method of claim 2, wherein the retrieving the latest performance data for a stopping or stopped sub-system includes:
retrieving the latest performance data for the stopping or stopped sub-system from a buffer; and
passing the latest performance data to an aggregator.

7. The method of claim 1, wherein the determining the overall state of the computer system includes:
calculating the overall state of the system by adding the latest performance data from each of the at least one sub-system together.

8. A data processing system for improving workload management of a computer system comprising a plurality of sub-systems, comprising:
a bus system;
a communications system connected to the bus system;
a memory connected to the bus system, wherein the memory includes a set of instructions; and
a processing unit connected to the bus system, wherein the processing unit executes the set of instructions to
receive a status of at least one sub-system, wherein the status of the at least one sub-system is one of active and inactive;
receiving a request for an overall state of the computer system;
responsive to the received request, retrieve latest performance data for one or more sub-systems having an active status and includes sending a pull request only to the one or more sub-systems having the active status; and
determine the overall state of the computer system based upon the latest performance data for the one or more sub-systems having the active status and previously stored performance data for one or more sub-systems, of the computer system, with an inactive status.

9. The data processing system of claim 8, wherein the inactive status of the at least one sub-system is one of idle, stopping or stopped.

10. The data processing system of claim 9, wherein the retrieving the latest performance data for the one or more sub-system having the active status includes:
receiving the latest performance data from the one or more sub-systems having the active status; and
passing the latest performance data to an aggregator.

11. The data processing system of claim 9, wherein the retrieving the latest performance data for an idle sub-system includes
determining if the status of the idle sub-system has changed;
in response to no status change, retrieving the latest performance data for the idle sub-system from a buffer; and
passing the latest performance data to an aggregator.

12. The data processing system of claim 11, in response to a status change, notifying a monitoring agent of the status change.

13. The data processing system of claim 9, wherein the retrieving the latest performance data for a stopping or stopped sub-system includes:
retrieving the latest performance data for the stopping or stopped sub-system from a buffer; and
passing the latest performance data to an aggregator.

14. The data processing system of claim 8, wherein the determining the overall state of the computer system includes:
calculating the overall state of the system by adding the latest performance data from each of the at least one sub-system together.

15. A computer program product including a non-transitory computer readable storage medium having embodied therein instructions for improving workload management of a computer system comprising a plurality of sub-systems, the instructions, when executed on a data processing system, causing the data processing system to perform the steps of:
receiving a status of at least one sub-system of the computer system, wherein the status of the at least one sub-system is one of active and inactive;
receiving a request for an overall state of the computer system;
responsive to the received request, retrieving latest performance data for one or more sub-systems having an active status and includes sending a pull request only to the one or more sub-systems having the active status; and
determining the overall state of the computer system based upon the latest performance data for the one or more sub-systems having the active status and previously stored performance data for one or more sub-systems, of the computer system, with an inactive status.

16. The computer program product of claim 15, wherein the inactive status of the at least one sub-system is one of idle, stopping or stopped.

17. The computer program product of claim 16, wherein the retrieving the latest performance data for the one or more sub-system having the active status includes:
receiving the latest performance data from the one or more sub-systems having the active status; and
passing the latest performance data to an aggregator.

18. The computer program product of claim 16, wherein the retrieving the latest performance data for an idle sub-system includes:
determining if the status of the idle sub-system has changed;
in response to no status change, retrieving the latest performance data for the idle sub-system from a buffer; and
passing the latest performance data to an aggregator.

19. The computer program product of claim 18, in response to a status change, notifying a monitoring agent of the status change.

20. The computer program product of claim 16, wherein the retrieving the latest performance data for a stopping or stopped sub-system includes:

retrieving the latest performance data for the stopping or stopped sub-system from a buffer; and passing the latest performance data to an aggregator.

21. The computer program product of claim 15, wherein the determining the overall state of the computer system includes:

calculating the overall state of the system by adding the latest performance data from each of the at least one sub-system together.

* * * * *